US009077160B2

(12) United States Patent
Valencic et al.

(10) Patent No.: US 9,077,160 B2
(45) Date of Patent: Jul. 7, 2015

(54) ENCLOSURE FOR ELECTRICAL DISTRIBUTION EQUIPMENT AND ELECTRICAL DISTRIBUTION APPARATUS EMPLOYING THE SAME

(71) Applicant: EATON CORPORATION, Cleveland, OH (US)

(72) Inventors: Matthew Michael Valencic, Williamsburg, VA (US); David Allen Bajzel, Aurora, OH (US); Jeremy Ryan Novotney, Cranberry Township, PA (US); Jonathan Keller Hamilton, Williamsburg, VA (US); Paul David Seff, Williamsburg, VA (US); Samuel Gonzalez, San Antonio, TX (US)

(73) Assignee: EATON CORPORATION, Cleveland, OH (US)

( * ) Notice: Subject to any disclaimer, the term of this patent is extended or adjusted under 35 U.S.C. 154(b) by 297 days.

(21) Appl. No.: 13/784,118

(22) Filed: Mar. 4, 2013

(65) Prior Publication Data

US 2014/0247539 A1    Sep. 4, 2014

(51) Int. Cl.
*H02B 1/30* (2006.01)
*H02B 1/38* (2006.01)
*H02B 1/56* (2006.01)
*H02B 7/06* (2006.01)

(52) U.S. Cl.
CPC ....... *H02B 1/30* (2013.01); *H02B 1/308* (2013.01); *H02B 1/38* (2013.01); *H02B 1/565* (2013.01); *H02B 7/06* (2013.01)

(58) Field of Classification Search
CPC .............. H05K 7/20; H02B 1/30; H02B 1/38; G01F 1/20; G01F 1/16
USPC ......... 361/601, 605, 622–627, 634, 640–648, 361/690–697, 724–728; 307/64, 66, 80, 82, 307/85, 113, 131, 140, 147, 125; 312/223.2, 223.3, 265.6; 174/50, 58, 174/59, 17 R, 520; 165/104.33, 121–126
See application file for complete search history.

(56) References Cited

U.S. PATENT DOCUMENTS

| 3,631,324 | A | * | 12/1971 | Jones ............................. 361/625 |
| 3,832,605 | A | * | 8/1974 | Clark, Jr. ....................... 174/481 |
| 4,772,999 | A | * | 9/1988 | Fiorina et al. .................. 363/141 |
| 5,136,463 | A | * | 8/1992 | Webster ......................... 361/622 |
| 5,578,792 | A | * | 11/1996 | Devonald et al. ............... 174/50 |
| 5,784,249 | A | * | 7/1998 | Pouliot .......................... 361/622 |
| 6,169,249 | B1 | * | 1/2001 | Teachout et al. .............. 174/559 |
| 6,657,320 | B1 | * | 12/2003 | Andrews et al. ................ 307/64 |
| 6,746,092 | B2 | * | 6/2004 | Leccia et al. ................... 312/222 |
| 6,879,483 | B2 | | 4/2005 | Johnson et al. |

(Continued)

*Primary Examiner* — Michail V Datskovskiy
(74) *Attorney, Agent, or Firm* — Eckert Seamans Cherin & Mellott, LLC; Nathaniel C. Wilks (57) ABSTRACT

An enclosure is for electrical distribution equipment including a number of inverters and alternating current distribution components. The enclosure includes: a first side; a second side adjacent to the first side; a third side adjacent to the second side; a fourth side adjacent to the first side and the third side; a top portion; a bottom portion; a number of first access panels installed on one of the first through fourth sides, the number of first access panels being configured to open to provide access to the number of inverters; and a second access panel installed on one of the first through fourth sides, the second access panel being configured to open to provide access to the alternating current distribution components.

24 Claims, 10 Drawing Sheets

(56) References Cited

U.S. PATENT DOCUMENTS

| | | | |
|---|---|---|---|
| 6,945,616 B2* | 9/2005 | Webster et al. | 312/265.3 |
| 6,969,130 B2* | 11/2005 | Newton et al. | 312/223.1 |
| 7,532,482 B2* | 5/2009 | Miller et al. | 361/752 |
| 8,233,278 B2* | 7/2012 | Hoffman et al. | 361/697 |
| 8,289,709 B2* | 10/2012 | Feltner et al. | 361/695 |
| 8,379,373 B2* | 2/2013 | Kikukawa et al. | 361/605 |
| 8,456,806 B2* | 6/2013 | Cosley et al. | 361/622 |
| 8,727,459 B2* | 5/2014 | Bernard et al. | 312/324 |
| 8,908,356 B2* | 12/2014 | Wang | 361/642 |
| 8,913,354 B2* | 12/2014 | Van Fossen et al. | 361/42 |
| 2006/0265853 A1* | 11/2006 | Povolny | 29/462 |
| 2006/0268533 A1* | 11/2006 | Miller et al. | 361/797 |
| 2010/0118488 A1* | 5/2010 | Hoffman et al. | 361/691 |
| 2010/0195273 A1* | 8/2010 | Kikukawa et al. | 361/612 |
| 2014/0159552 A1* | 6/2014 | Bravo et al. | 312/198 |

* cited by examiner

ENCLOSURE FOR ELECTRICAL DISTRIBUTION EQUIPMENT AND ELECTRICAL DISTRIBUTION APPARATUS EMPLOYING THE SAME

BACKGROUND

1. Field

The disclosed concept relates generally to electrical distribution apparatus, and in particular, to electrical distribution apparatus, such as for example, for photovoltaic systems. The disclosed concept also relates to enclosures for electrical distribution equipment.

2. Background Information

Photovoltaic systems convert solar energy to electrical power and distribute the electrical power to, for example, electric devices or a power grid. In more detail, a photovoltaic system generally includes solar panels which convert the solar energy into direct current power. Well known photovoltaic systems also include electrical distribution equipment, such as an inverter which converts the direct current power to alternating current power, and other alternating current ("AC") distribution components. The electrical distribution equipment may also include a transformer, which steps up or steps down the alternating current voltage, communication components, control components, and other optional distribution equipment.

In prior photovoltaic systems, the electrical distribution equipment has been installed in a non-standardized manner. For example, in some photovoltaic systems, the electrical distribution equipment is installed in an electrical yard. In other photovoltaic systems, some of the electrical distribution equipment is installed beneath the solar panels while the rest of the electrical substation equipment is installed in an electrical yard. However, due to this non-standardized approach, the layout of the electrical distribution equipment must be uniquely considered in the design of each photovoltaic system. Additionally, each component of the electrical distribution equipment must be individually installed at the site of the photovoltaic system.

There is room for improvement in electrical distribution apparatus.

There is also room for improvement in enclosures for electrical distribution equipment.

SUMMARY

These needs and others are met by embodiments of the disclosed concept, which provide an enclosure for electrical distribution equipment. These needs and others are also net by embodiments of the disclosed concept, which provide an electrical distribution apparatus employing an enclosure.

In accordance with aspects of the disclosed concept, an enclosure is for electrical distribution equipment comprising a number of inverters and alternating current distribution components. The enclosure comprises: a first side; a second side adjacent to the first side; a third side adjacent to the second side; a fourth side adjacent to the first side and the third side; a top portion; a bottom portion; a number of first access panels installed on one of the first through fourth sides, the number of first access panels being configured to open to provide access to the number of inverters; and a second access panel installed on one of the first through fourth sides, the second access panel being configured to open to provide access to the alternating current distribution components.

Also in accordance with aspects of the disclosed concept, an electrical distribution apparatus comprises: a number of inverters; a plurality of alternating current distribution components; and an enclosure enclosing the number of inverters and the alternating current distribution components, the enclosure comprising: a first side; a second side adjacent to the first side; a third side adjacent to the second side; a fourth side adjacent to the first side and the third side; a top portion; a bottom portion; a number of first access panels installed on one of the first through fourth sides, the number of first access panels being configured to open to provide access to the number of inverters; and a second access panel installed on one of the first through fourth sides, the second access panel being configured to open to provide access to the alternating current distribution components.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1A:
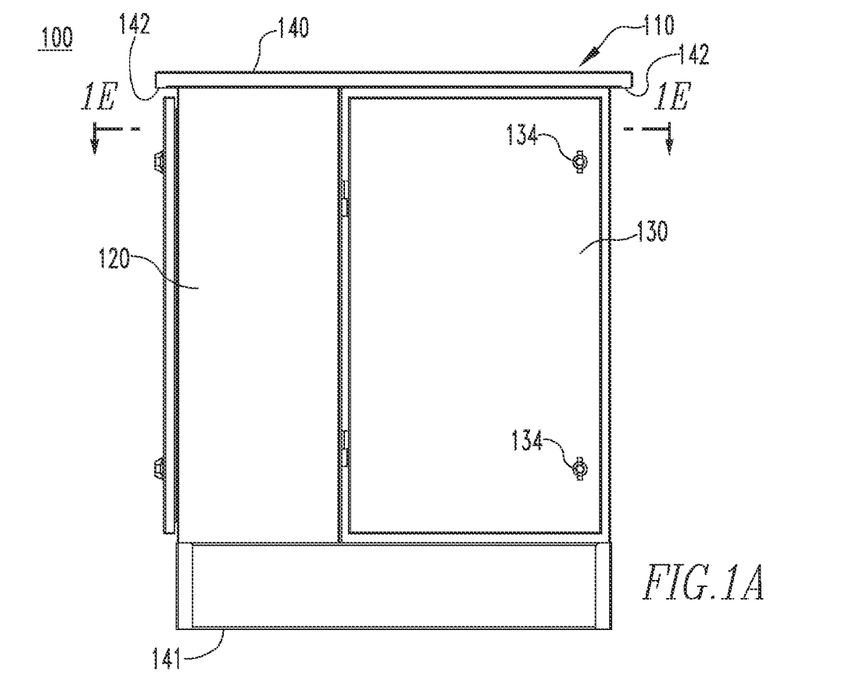
FIG. 1A is a front elevation view of an electrical distribution apparatus in accordance with an example embodiment of the disclosed concept.
Figure 1B:
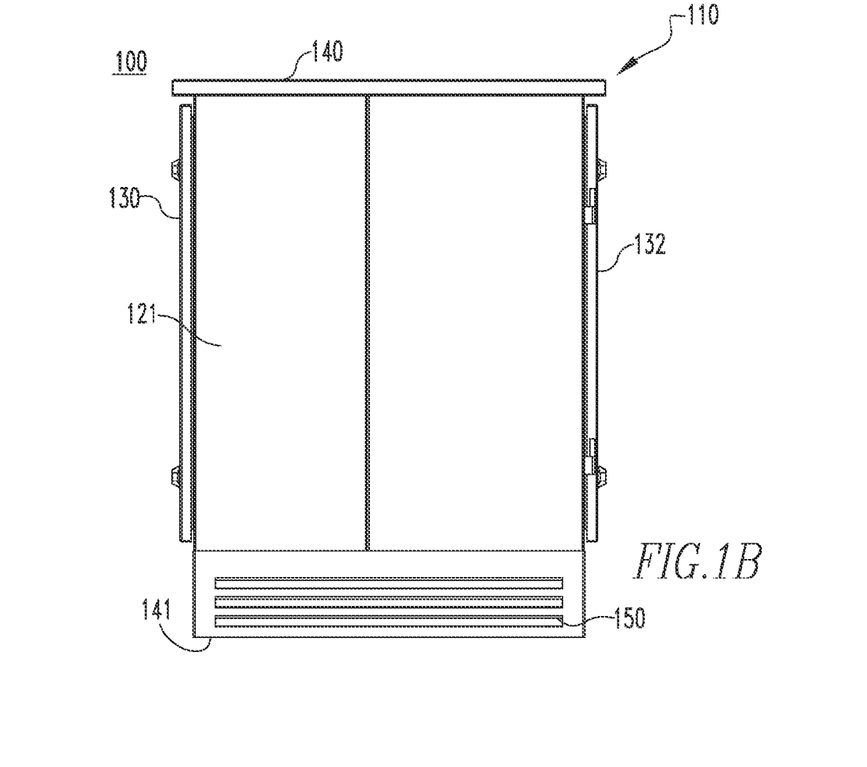
FIG. 1B is a right side elevation view of the electrical distribution apparatus of FIG. 1A.
Figure 1C:
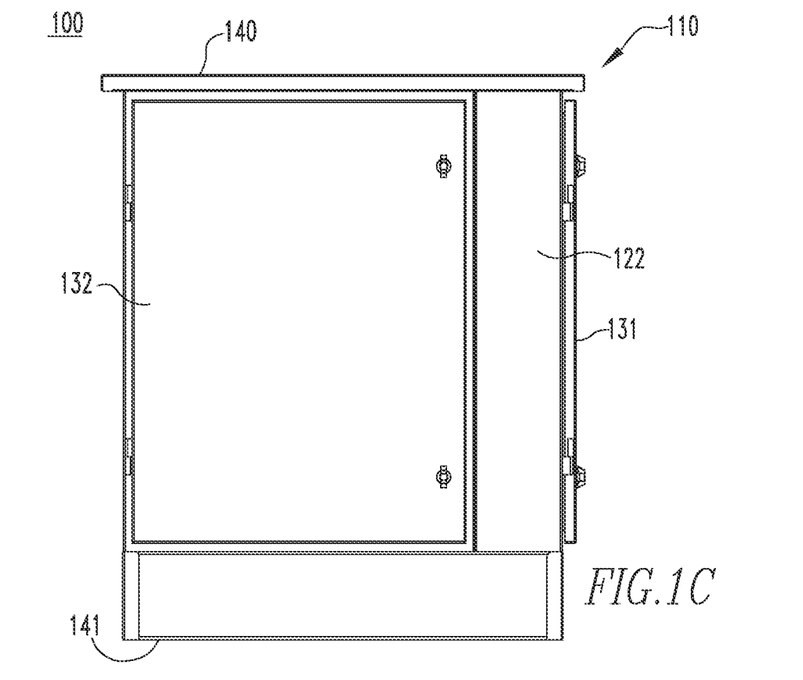
FIG. 1C is a rear elevation view of the electrical distribution apparatus of FIG. 1A.
Figure 1D:
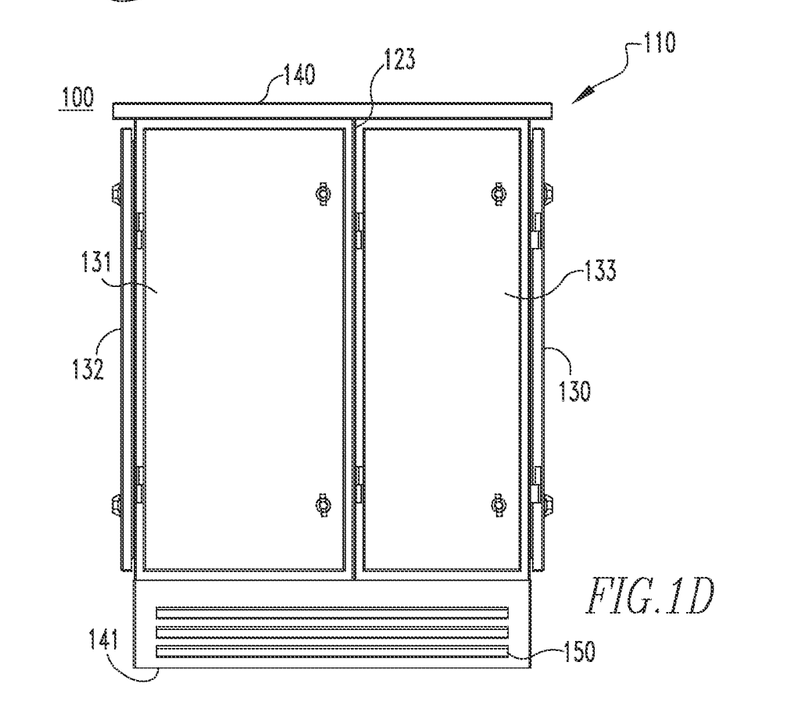
FIG. 1D is a left side elevation view of the electrical distribution apparatus of FIG. 1A.
Figure 1E:
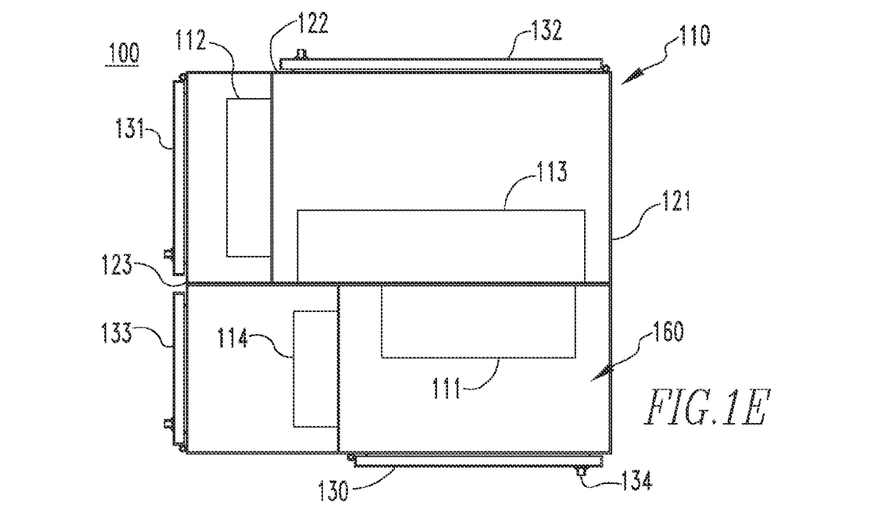
FIG. 1E is a sectional view of the electrical distribution apparatus of FIG. 1A along line 1E-1E.
Figure 1F:
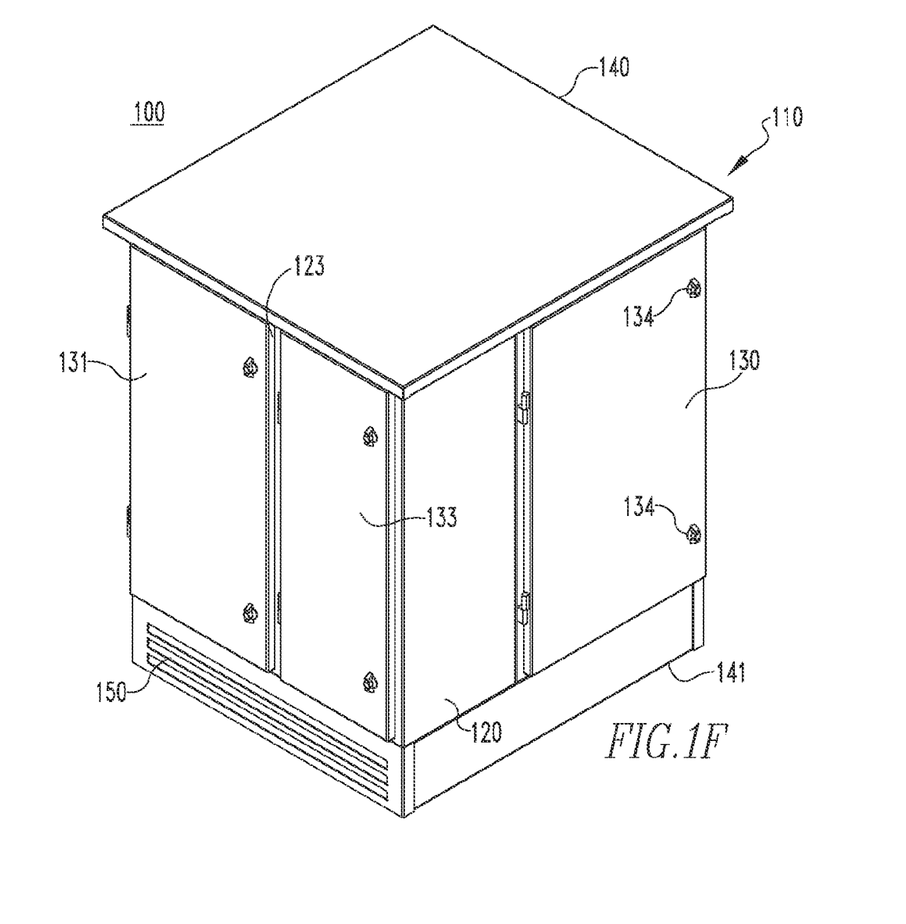
FIG. 1F is an isometric view of the electrical distribution apparatus of FIG. 1A.

Referring to FIGS. 1A-1F, an electrical distribution apparatus 100 is shown. The electrical distribution apparatus 100 includes an enclosure 110 that encloses an inverter 111, alternating current distribution components 112, a transformer 113, and communication and control components 114, as shown in FIG. 1E.

The inverter 111 is configured to convert direct current power into alternating current power. The alternating current distribution components 112 include equipment to support distribution of the alternating current power (e.g., without limitation, a distribution panelboard or load center and associated disconnect switch). The transformer 113 is configured to step up or step down the voltage of the alternating current power output by the inverter 111. The communication and control components 114 include equipment for communicating with external devices (not shown) and equipment for controlling internal and external components. For example and without limitation, the communication and control components 114 can include a data logger, a network interface, a power meter, lighting control equipment, and solar panel tracking control equipment.

The enclosure 110 includes a first side 120, a second side 121 adjacent to the first side 120, a third side 122 adjacent to the second side 121, and a fourth side 123 adjacent to the first side 120 and the third side 122. The enclosure 110 also includes a top portion 140 and a bottom portion 141. The first side 120, the second side 121, the third side 123, the fourth side 124, the top portion 140, and the bottom portion 141 define a volume 160 within which the inverter 111, the alternating current distribution equipment 112, the transformer 113, and the communication and control components 114 are enclosed, as shown in FIG. 1E.

The enclosure 110 also includes a first access panel 130, a second access panel 131, a third access panel 132, and a fourth access panel 133. The first access panel 130 is installed on the first side 120. The first access panel 130 is configured to open to provide access to the inverter 111. The second access panel 131 is installed on the fourth side 123 and is configured to open to provide access to the alternating distribution components 112. The third access panel 132 is installed on the third side 122 and is configured to open to provide access to the transformer 113. The fourth access panel 133 is installed on the fourth side 123 and is configured to open to provide access to the communication and control components 114. The first through fourth access panels 130, 131,132,133 can each be doors having lockable latches 134 installed thereon, as is shown with the first access panel 130 of FIG. 1A.

The upper and lower boundaries of the interior volume 160 of the enclosure 110 are defined by a top portion 140 and a bottom portion 141. The top portion 140 extends beyond each of the first through fourth sides 120,121,122,123 so as to form an overhanging portion 142.

The enclosure 110 also includes ventilation grills 150 formed in the second side 121 and in the fourth side 123. However, it will be appreciated that ventilation grills 150 may be formed in any side of the enclosure 110 without departing from the scope of the disclosed concept. The ventilation grills 150 allow air to flow between the interior and the exterior of the enclosure 110.

Figure 2A:
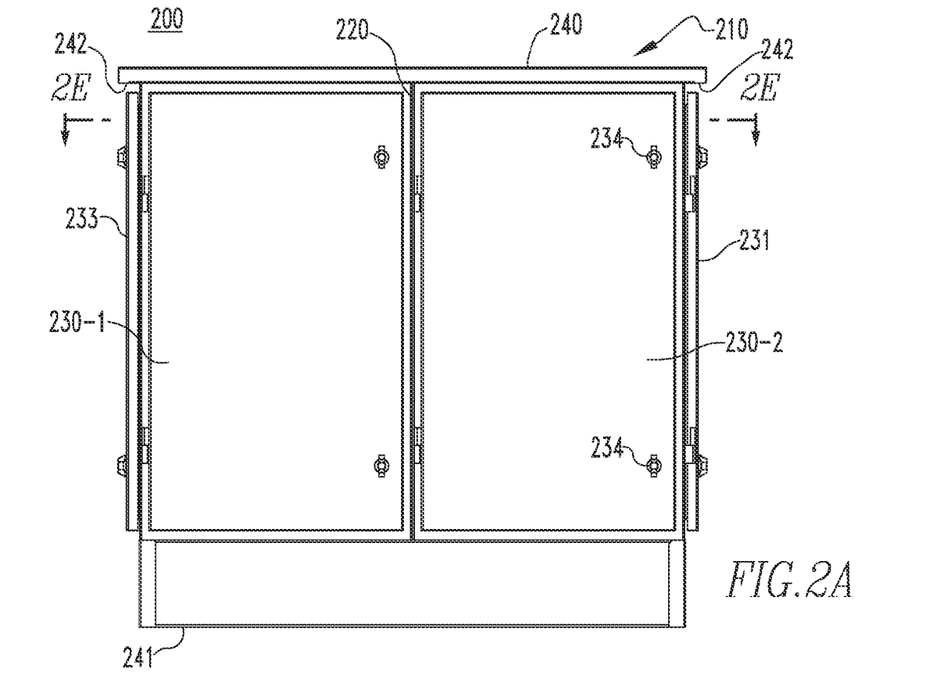
FIG. 2A is a front elevation view of an electrical distribution apparatus in accordance with another example embodiment of the disclosed concept.
Figure 2B:
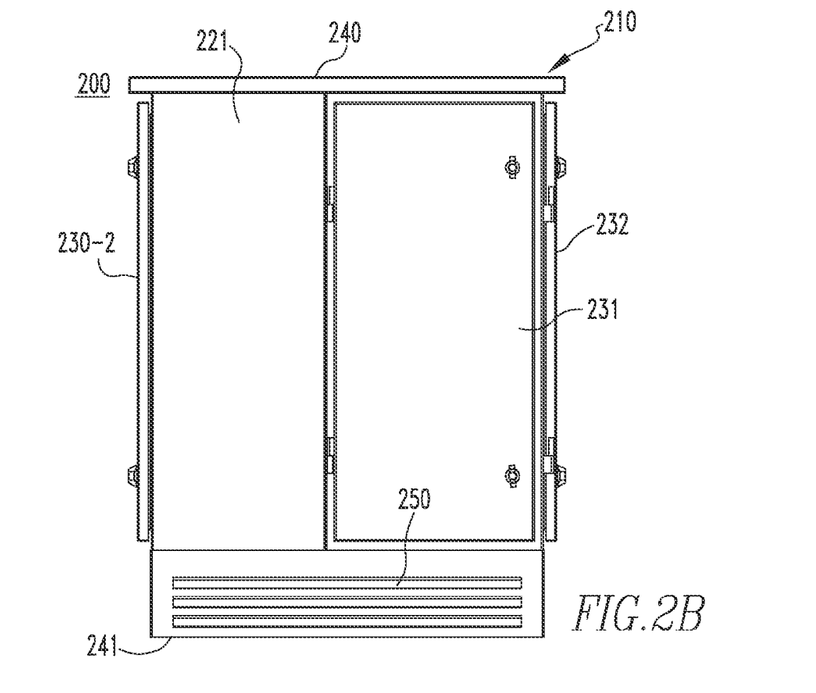
FIG. 2B is a right side elevation view of the electrical distribution apparatus of FIG. 2A.
Figure 2C:
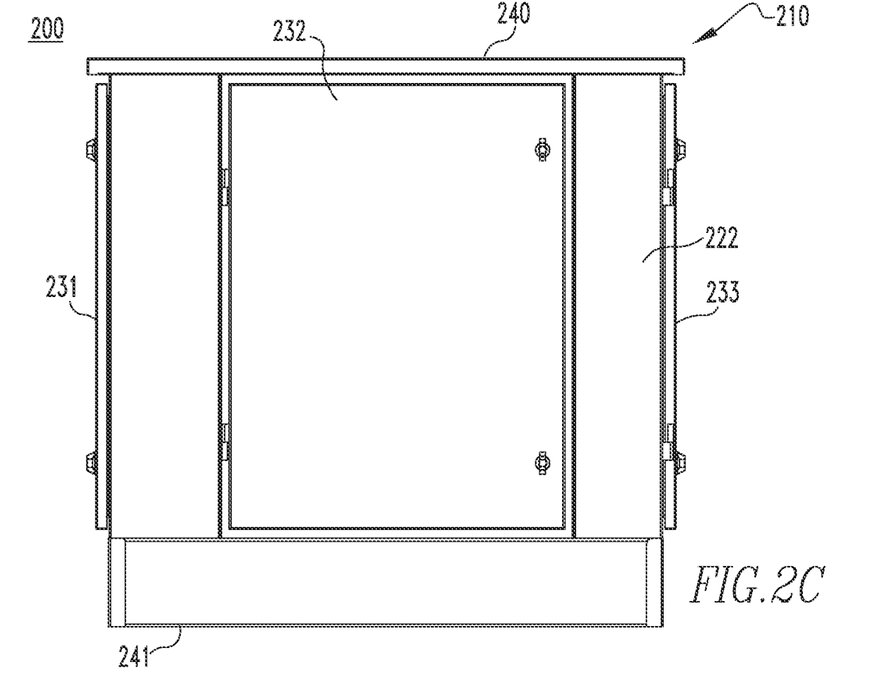
FIG. 2C is a rear elevation view of the electrical distribution apparatus of FIG. 2A.
Figure 2D:
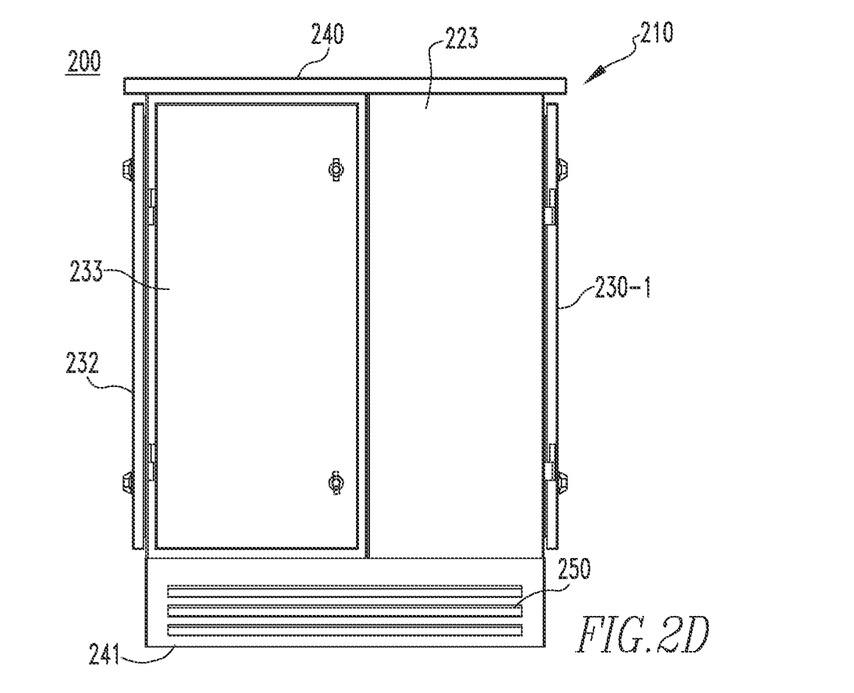
FIG. 2D is a left side elevation view of the electrical distribution apparatus of FIG. 2A.
Figure 2E:
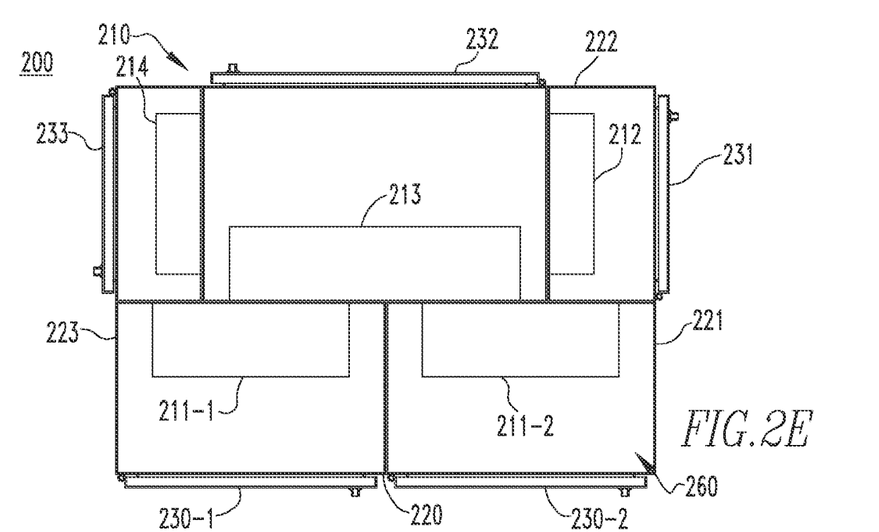
FIG. 2E is a sectional view of the electrical distribution apparatus of FIG. 2A along line 2E-2E.
Figure 2F:
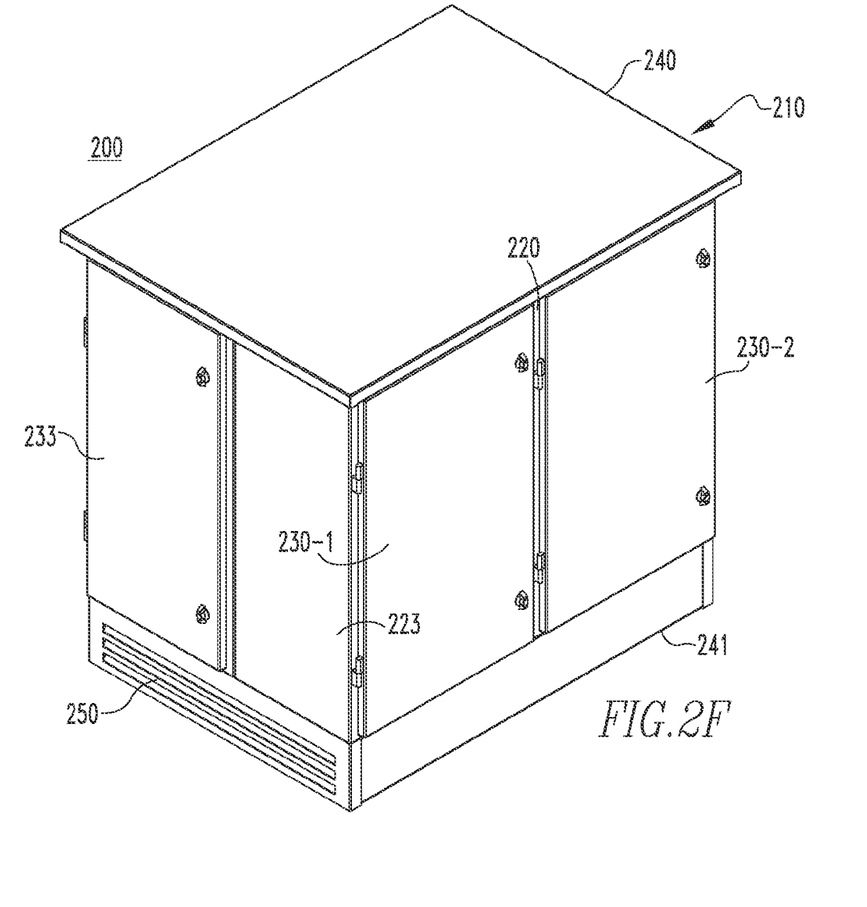
FIG. 2F is an isometric view of the electrical distribution apparatus of FIG. 2A.

FIGS. 2A-2F show another electrical distribution apparatus 200 in accordance with another example embodiment of the disclosed concept. The electrical distribution apparatus 200 includes an enclosure 210 that encloses two inverters 211-1,211-2, alternating current distribution components 212, a transformer 213, and communication and control components 214, as shown in FIG. 2E.

The inverters 211-1,211-2 are configured to convert direct current power into alternating current power. The alternating current distribution components 212 includes equipment to support distribution of the alternating current power (e.g., without limitation, a distribution panelboard or load center and associated disconnect switch). The transformer 213 is configured to step up or step down the voltage of the alternating current power output by the inverters 211-1,211-2. The communication and control components 214 include equipment for communicating with external devices and equipment for controlling internal and external components. For example and without limitation, the communication and control components 214 can include a data logger, a network interface, a power meter, lighting control equipment, and solar panel tracking control equipment.

The enclosure 210 includes a first side 220, a second side 221 adjacent to the first side 220, a third side 222 adjacent to the second side 221, and a fourth side 223 adjacent to the first side 220 and the third side 222. The enclosure 210 also includes a top portion 240 and a bottom portion 241. The first side 220, the second side 221, the third side 223, the fourth side 224, the top portion 225, and the bottom portion 226 define a volume 260 within which the inverters 211-1,211-2, the alternating current distribution components 212, the transformer 213, and the communication and control components 214 are enclosed, as shown in FIG. 2E.

The enclosure 210 also includes two first access panels 230-1,230-2, a second access panel 231, a third access panel 232, and a fourth access panel 233. The first access panels 230-1,230-2 are installed on the first side 220. The first access panels 230-1,230-2 are configured to open to provide access to the respective inverters 211-1,211-2. The second access panel 231 is installed on the second side 221 and is configured to open to provide access to the alternating current distribution components 212. The third access panel 232 is installed on the third side 222 and is configured to open to provide access to the transformer 213. The fourth access panel 233 is installed on the fourth side 223 and is configured to open to provide access to the communication and control components 214. The first access panels 230-1,230-2, the second access panel 231, the third access panel 232, and the fourth access panel 233 can each be doors having lockable latches 234 installed thereon, as shown in the first access panel 230-2 of FIG. 2A.

The upper and lower boundaries of the interior volume 260 of the enclosure 210 are defined by a top portion 240 and a bottom portion 241. The top portion 240 extends beyond each of the first through fourth sides 220,221,222,223 so as to form an overhanging portion 242.

The enclosure 210 also includes ventilation grills 250 formed in the second side 221 and in the fourth side 223. However, it will be appreciated that ventilation grills 250 may be formed in any side of the enclosure 210 without departing from the scope of the disclosed concept. The ventilation grills 250 allow air to flow from the interior to the exterior of the enclosure 210 and vice versa.

Figure 3A:
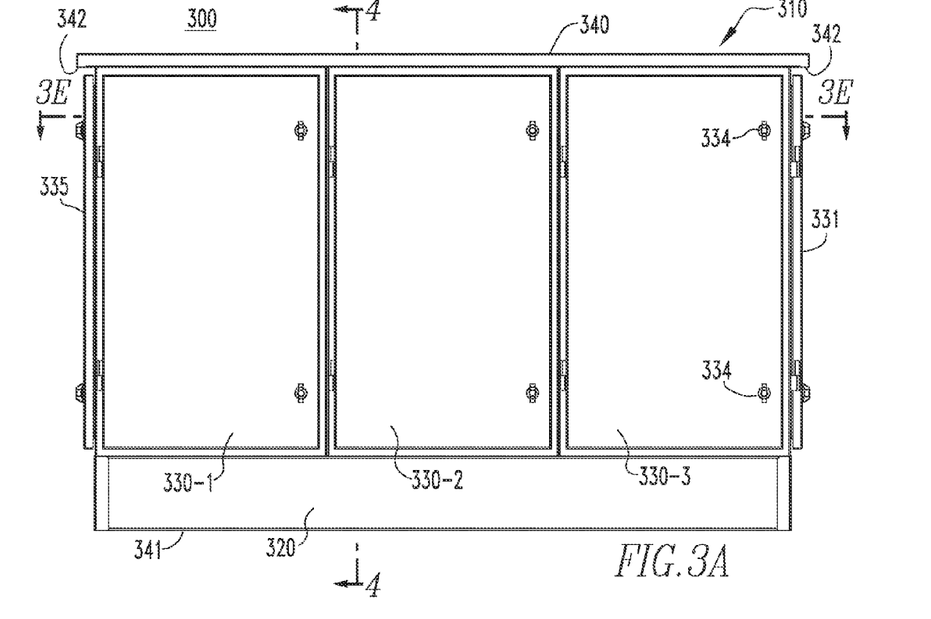
FIG. 3A is a front elevation view of an electrical distribution apparatus in accordance with another example embodiment of the disclosed concept.
Figure 3B:
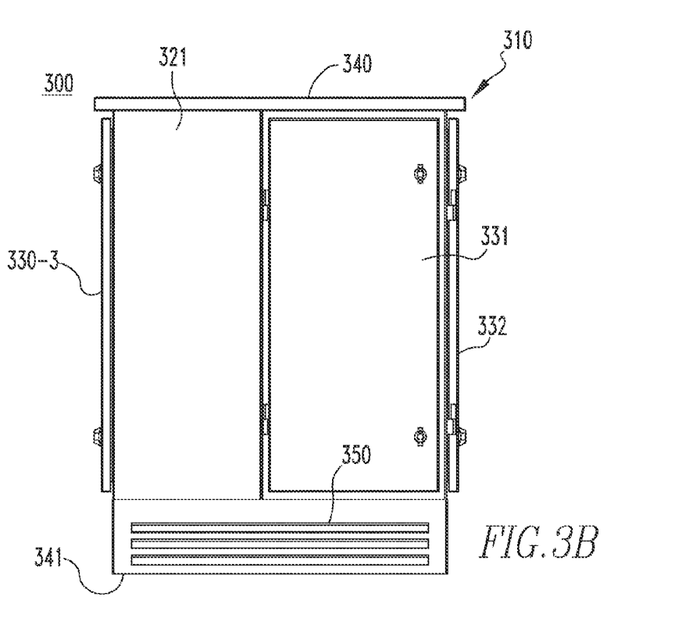
FIG. 3B is a right side elevation view of the electrical distribution apparatus of FIG. 3A.
Figure 3C:
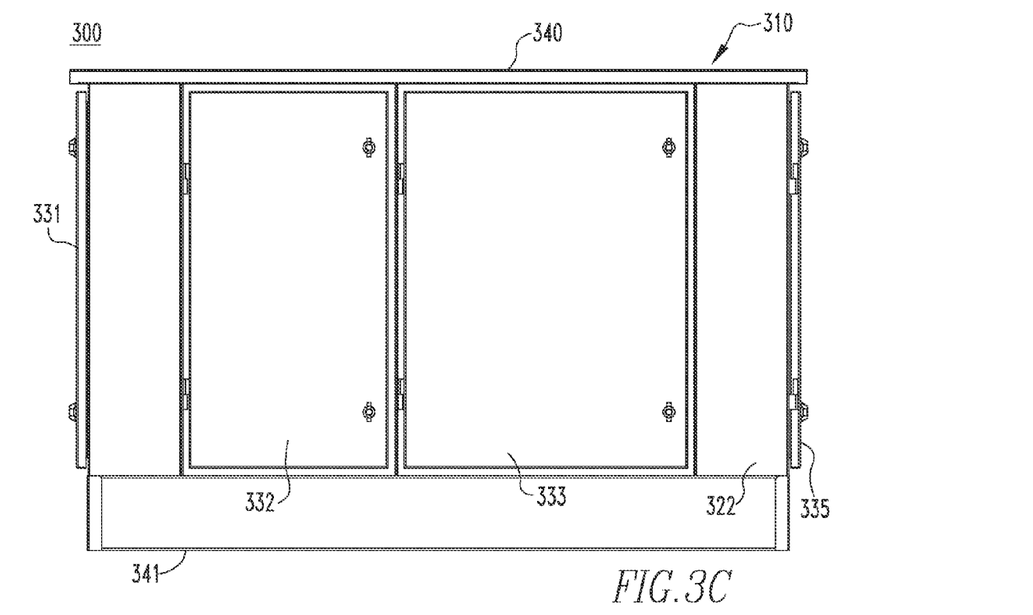
FIG. 3C is a rear elevation view of the electrical distribution apparatus of FIG. 3A.
Figure 3D:
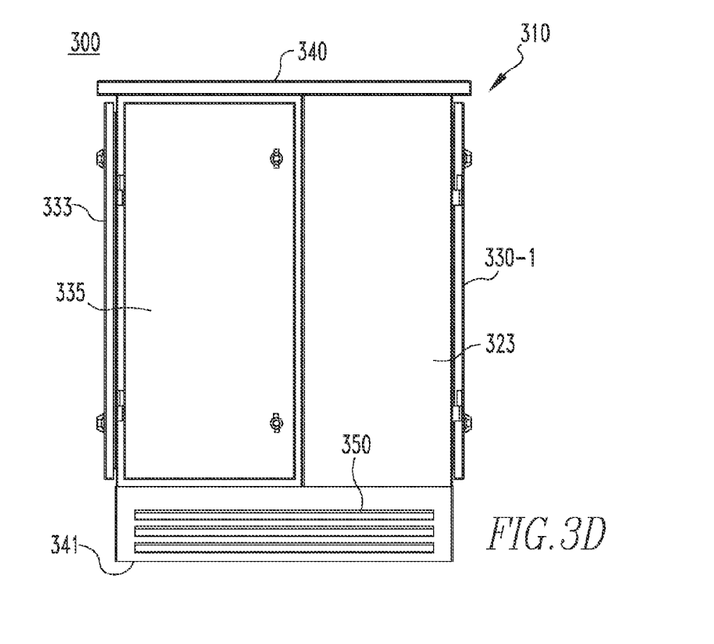
FIG. 3D is a left side elevation view of the electrical distribution apparatus of FIG. 3A.
Figure 3E:
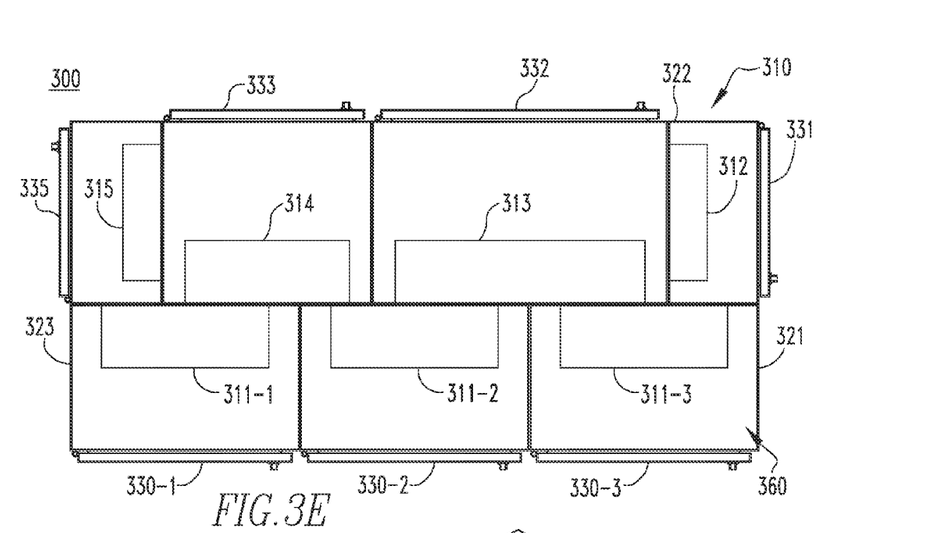
FIG. 3E is a sectional view of the electrical distribution apparatus of FIG. 3A along line 3E-3E.
Figure 3F:
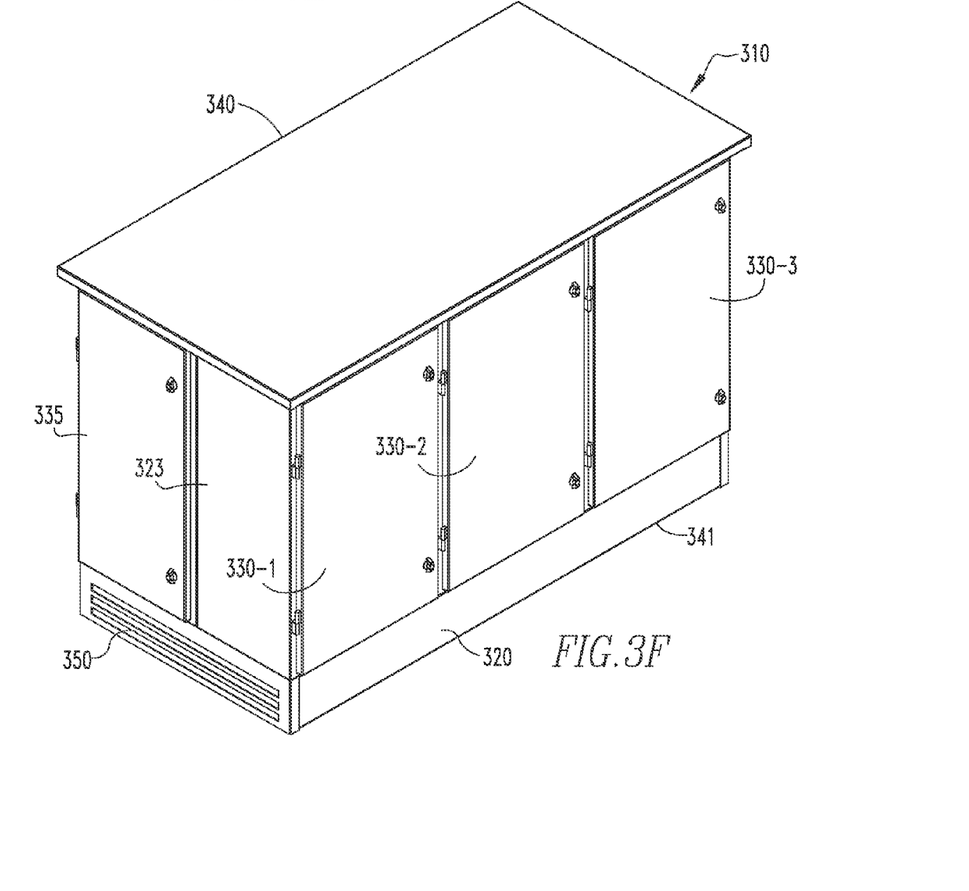
FIG. 3F is an isometric view of the electrical distribution apparatus of FIG. 3A.

FIGS. 3A-3F show an electrical distribution apparatus 300 in accordance with another example embodiment of the disclosed concept. The electrical distribution apparatus 300 includes an enclosure 310 that encloses three inverters 311-1,311-2,311-3, alternating current distribution components 312, a transformer 313, communication and control components 314, and other distribution components 315, as shown in FIG. 3E.

The inverters 311-1,311-2,311-3 are configured to convert direct current power into alternating current power. The alternating current distribution components 312 include equipment to support distribution of the alternating current power (e.g., without limitation, a distribution panelboard or load center and associated disconnect switch). The transformer 313 is configured to step up or step down the voltage of the alternating current power output by the inverters 311-1,311-2,311-3. The communication and control components 314 include equipment for communicating with external devices (not shown) and equipment for controlling internal and external components. For example and without limitation, the communication and control components 314 can include a data logger, a network interface, a power meter, lighting control equipment, and solar panel tracking control equipment. The other distribution components 315 include additional equipment for use in distributing the alternating current power. For example and without limitation, the other distribution components 315 can include equipment to aggregate the outputs of the inverters 311-1,311-2,311-3.

The enclosure 310 includes a first side 320, a second side 321 adjacent to the first side 320, a third side 322 adjacent to the second side 321, and a fourth side 323 adjacent to the first side 320 and the third side 322. The enclosure 310 also includes a top portion 340 and a bottom portion 341. The first side 320, the second side 321, the third side 323, the fourth side 324, the top portion 340, and the bottom portion 341 define a volume 360 within which the inverters 311-1,311-2, 311-3, the alternating current distribution components 312, the transformer 313, the communication and control components 314, and the optional distribution components 315 are enclosed.

The enclosure 310 also includes three first access panels 330-1,330-2,330-3, a second access panel 331, a third access panel 332, a fourth access panel 333, and a fifth access panel 335. The first access panels 330-1,330-2,330-3 are installed on the first side 320. The first access panels 330-1, 330-2, 330-3 are configured to open to provide access to the respective inverters 311-1,311-2,311-3. The second access panel 331 is installed on the second side 321 and is configured to open to provide access to the AC distribution equipment 312. The third access panel 332 is installed on the third side 322 and is configured to open to provide access to the transformer 313. The fourth access panel 333 is installed on the third side 322 and is configured to open to provide access to the communication and control components 314. The fifth access panel 335 is installed on the fourth side 323 and is configured to provide access to the optional distribution components 315. The first access panels 330-1, 330-2,330-3, the second access panel 331, the third access panel 332, the fourth access panel 333, and the fifth access panel 335 can each be doors having lockable latches 334 installed thereon, as shown in the first access panel 330-3 of FIG. 3A.

The upper and lower boundaries of the interior volume 360 of the enclosure 310 are defined by a top portion 340 and a bottom portion 341. The top portion 340 extends beyond each of the first through fourth sides 320,321,322,323 so as to form an overhanging portion 342.

The enclosure 310 also includes ventilation grills 350 formed in the second side 321 and in the fourth side 323. However, it will be appreciated that ventilation grills 350 may be formed in any side of the enclosure 310 without departing from the scope of the disclosed concept. The ventilation grills 350 allow air to flow from the interior to the exterior of the enclosure 310 and vice versa.

Figure 4:
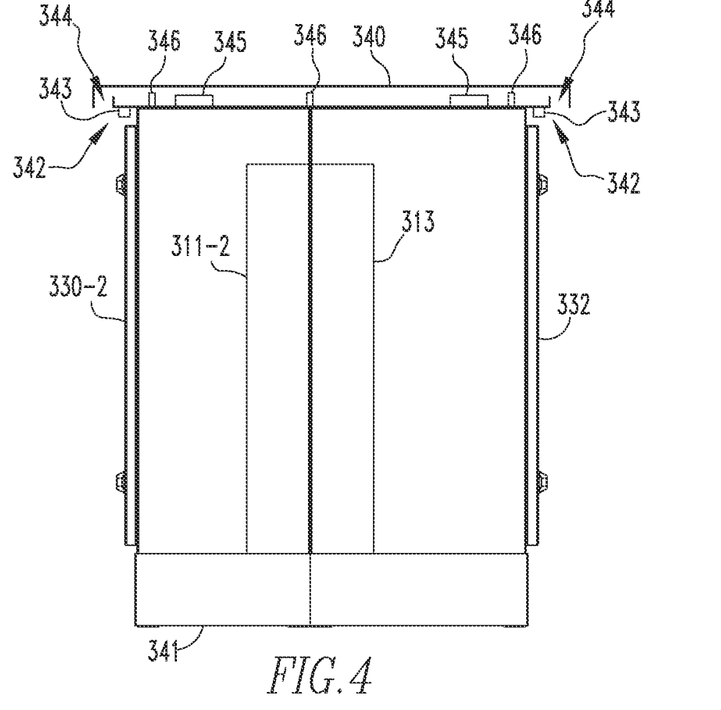
FIG. 4 is another sectional view of the electrical distribution apparatus of FIG. 3A along line 4-4.

Referring to FIG. 4, overhanging portion 342 of the top portion 340 of the electrical distribution apparatus 300 includes lighting 343 installed thereon.

One or more openings 344 are formed in the top portion 340. The openings 344 are operable to allow fluid communication between the interior and the exterior of the enclosure 310. The openings 344 can be formed in a lower part of the top portion 340 so as to allow air to exit the enclosure 310 while preventing rain from entering the enclosure 310.

The enclosure 310 may also include one or more lifting eyes 346, which can be installed on the enclosure 310 under the top portion 340. Cables or other means can be attached to the lifting eyes 346 when moving the enclosure 310.

The enclosure 310 also includes one or more cooling fans 345 installed within the volume 360 defined by the first through fourth sides 320,321,322,323, the top portion 340, and the bottom portion 341 (e.g., without limitation, in the area under the top portion 340). The cooling fans 345 are operable to circulate air in through the ventilation grills 350 (FIGS. 3B and 3D) and out through the openings 344 in the top portion 340.

While the lighting 343, openings 344, lifting eyes 346, and cooling fans 345 are disclosed with respect to the electrical distribution apparatus 300, it will be appreciated that electrical distribution apparatus 100 or 200 can also be adapted to include these components as well.

The disclosed concept is suitable for use in photovoltaic applications. However, it will be understood that the disclosed concept may readily be applied to any other suitable electrical distribution application.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An enclosure for electrical distribution equipment comprising a number of inverters and alternating current distribution components, the enclosure comprising:
    a first side;
    a second side adjacent to the first side;
    a third side adjacent to the second side;
    a fourth side adjacent to the first side and the third side;
    a top portion;
    a bottom portion;
    a number of first access panels installed on one of the first through fourth sides, the number of first access panels being configured to open to provide access to the number of inverters; and
    a second access panel installed on one of the first through fourth sides, the second access panel being configured to open to provide access to the alternating current distribution components,
    wherein the top portion includes an overhanging portion structured to extend beyond the first side, the second side, the third side and the fourth side.

2. The enclosure of claim 1, wherein the electrical distribution equipment further comprises a transformer; and wherein a third access panel is installed on one of the first through fourth sides, the third access panel being configured to open to provide access to the transformer.

3. The enclosure of claim 2, wherein the electrical distribution equipment further comprises control components and communication components; and wherein a fourth access panel is installed on one of the first through fourth sides, the fourth access panel being configured to open to provide access to the control components and the communication components.

4. The enclosure of claim 3, wherein the number of inverters is one inverter and the number of first access panels is one first access panel; and wherein the one first access panel is installed on the first side, the third access panel is installed on the third side, and the second and fourth access panels are installed on the fourth side.

5. The enclosure of claim 3, wherein the number of inverters is two inverters and the number of first access panels is two first access panels; and wherein the two first access panels are installed on the first side, the second access panel is installed on the second side, the third access panel is installed on the third side, and the fourth access panel is installed on the fourth side.

6. The enclosure of claim 3, wherein the number of inverters is three inverters and the number of first access panels is three first access panels; and wherein the three first access panels are installed on the first side, the second access panel is installed on the second side, and the third and fourth access panels are installed on the third side.

7. The enclosure of claim 6, wherein the electrical distribution equipment further comprises other distribution components; and wherein a fifth access panel is installed on the fourth side, the fifth access panel being configured to open to provide access to the other distribution components.

8. The enclosure of claim 1, wherein the overhanging portion includes lighting installed therein.

9. The enclosure of claim 1, wherein at least one of the first side, the second side, the third side and the fourth side includes a ventilation grill formed therein.

10. The enclosure of claim 9, wherein at least one opening is formed in the top portion, the opening being operable to allow fluid communication between the interior and the exterior of the enclosure.

11. The enclosure of claim 10, wherein a cooling fan is installed within a volume defined by the first through fourth sides, the top portions, and the bottom portion; and wherein operation of the cooling fan facilitates air circulation into the enclosure through the ventilation grill and out of the enclosure through the at least one opening.

12. The enclosure of claim 1, wherein the first access panel and the second access panel are doors; and wherein the doors each include a number of lockable latches.

13. An electrical distribution apparatus comprising:
a number of inverters;
a plurality of alternating current distribution components; and
an enclosure enclosing the number of inverters and the alternating current distribution components, the enclosure comprising:
a first side;
a second side adjacent to the first side;
a third side adjacent to the second side;
a fourth side adjacent to the first side and the third side;
a top portion;
a bottom portion;
a number of first access panels installed on one of the first through fourth sides, the number of first access panels being configured to open to provide access to the number of inverters; and
a second access panel installed on one of the first through fourth sides, the second access panel being configured to open to provide access to the alternating current distribution components,
wherein the top portion includes an overhanging portion structured to extend beyond the first side, the second side, the third side and the fourth side.

14. The electrical distribution apparatus of claim 13, wherein the enclosure encloses a transformer within a volume defined by the first through fourth sides, the top portion, and the bottom portion; and wherein the enclosure further comprises a third access panel installed on one of the first through fourth sides, the third access panel being configured to open to provide access to the transformer.

15. The electrical distribution apparatus of claim 14, wherein the enclosure encloses control components and communication components within a volume defined by the first through fourth sides, the top portion, and the bottom portion; and wherein the enclosure further comprises a fourth access panel installed on one of the first through fourth sides, the fourth access panel being configured to open to provide access to the control components and the communication components.

16. The electrical distribution apparatus of claim 15, wherein the number of inverters is one inverter and the number of first access panels is one first access panel; and wherein the one first access panel is installed on the first side, the third access panel is installed on the third side, and the second and fourth access panels are installed on the fourth side.

17. The electrical distribution apparatus of claim 15, wherein the number of inverters is two inverters and the number of first access panels is two first access panels; and wherein the two first access panels are installed on the first side, the second access panel is installed on the second side, the third access panel is installed on the third side, and the fourth access panel is installed on the fourth side.

18. The electrical distribution apparatus of claim 15, wherein the number of inverters is three inverters and the number of first access panels is three first access panels; and wherein the three first access panels are installed on the first side, the second access panel is installed on the second side, and the third and fourth access panels are installed on the third side.

19. The electrical distribution apparatus of claim 18, wherein the enclosure encloses other distribution components within a volume defined by the first through fourth sides, the top portion, and the bottom portion; and wherein the enclosure further comprises a fifth access panel installed on the second side, the fifth access panel being configured to open to provide access to the other distribution components.

20. The electrical distribution apparatus of claim 13, wherein the overhanging portion includes lighting installed therein.

21. The electrical distribution apparatus of claim 13, wherein at least one of the first side, the second side, the third side and the fourth side includes a ventilation grill formed therein.

22. The electrical distribution apparatus of claim 21, wherein at least one opening is formed in the top portion, the opening being operable to allow fluid communication between an interior and an exterior of the enclosure.

23. The electrical distribution apparatus of claim 22, wherein the enclosure further comprises a cooling fan installed within a volume defined by the first through fourth sides, the top portion, and the bottom portion; and wherein operation of the cooling fan facilitates air circulation into the enclosure through the ventilation grill and out of the enclosure through the at least one opening.

24. The electrical distribution apparatus of claim 13, wherein the first access panel and the second access panel are doors; and wherein the doors each include a number of lockable latches.

\* \* \* \* \*